United States Patent [19]

Rapp

[11] 4,337,656
[45] Jul. 6, 1982

[54] DEVICE FOR MEASURING DEPTH AND TEMPERATURE ESPECIALLY FOR TANKS OR THE LIKE

[76] Inventor: Eugen Rapp, Tilsiterstr. 12, 2805 Stuhr II, Fed. Rep. of Germany

[21] Appl. No.: 177,528

[22] Filed: Aug. 12, 1980

[30] Foreign Application Priority Data

Aug. 9, 1979 [DE] Fed. Rep. of Germany ....... 2932243

[51] Int. Cl.³ ............................................ G01F 23/28
[52] U.S. Cl. .................................. 73/290 V; 73/292; 374/119
[58] Field of Search ................... 73/290 V, 292, 305, 73/306, 307, 308

[56] References Cited

U.S. PATENT DOCUMENTS

| 4,090,407 | 5/1978 | Shuler et al. | 73/290 V |
| 4,130,018 | 12/1978 | Adams et al. | 73/290 V |
| 4,158,964 | 6/1979 | McCrea et al. | 73/290 V |
| 4,170,765 | 10/1979 | Austin et al. | 73/290 V X |
| 4,229,798 | 10/1980 | Rosie et al. | 73/290 V X |

FOREIGN PATENT DOCUMENTS 620828  8/1978  U.S.S.R. ........................ 73/290 V

Primary Examiner—Kyle L. Howell
Assistant Examiner—Joseph W. Roskos
Attorney, Agent, or Firm—Trexler, Bushnell & Wolters, Inc.

[57] ABSTRACT

A device for measuring the depth and temperature of a liquid stored in a tank is provided. The device includes a hermetically sealed vertically disposed tube having ultrasonic transmitter/receiver devices at either end thereof with a reflector vertically movable in the tube and having a through-hole therein permitting transmission from one end of the tube to the other as well as reflection. A float encircles the tube and moves up and down with the level of liquid in the storage tank. The float and reflector are magnetically interconnected so that the reflector moves up and down with the float.

18 Claims, 3 Drawing Figures

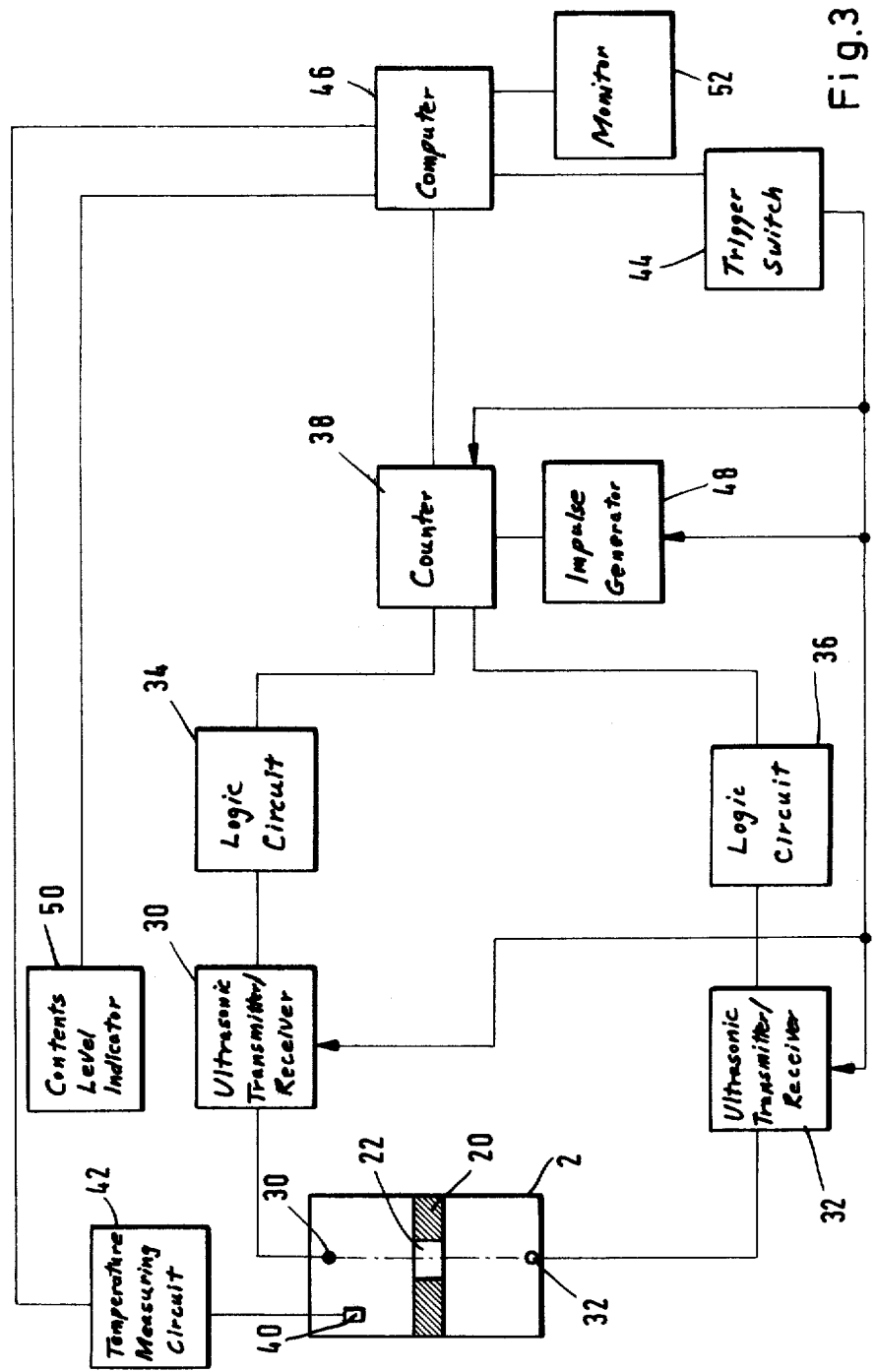

DEVICE FOR MEASURING DEPTH AND TEMPERATURE ESPECIALLY FOR TANKS OR THE LIKE

DESCRIPTION

The invention involves a device for measuring length and temperature, especially for tank plants or the like, with a measuring tube, a tracking device around the measuring tube for tracking a cylindrical reflector, which can be moved within the measuring tube, and with a first ultrasonic transmitter/receiver in one end of the measuring tube.

Such a device is already known and measures the diffusion time which ultrasonic signals require to go from the ultrasonic transmitter/receiver to the reflector and then back to the ultrasonic transmitter/receiver. From the measured diffusion time one can then calculate the diffusion span, and thus particularly the height level of the reflector as a measure for the existing level of contents within a tank, provided the temperature in the diffusion span is known. Alternatively, when the diffusion span is known, the average temperature inside the measuring tube can be ascertained.

However, the temperature in the measuring tube is subject to substantial temporal and local fluctuations, particularly depending on the contents of the tank and the existing level of the contents, so that assuming a constant, pre-determined temperature for all times leads to incorrect results in the measurement of length and/or condition. Since the level of contents varies as a rule and is especially dependent on temperature, and since the length of the diffusion span is thus generally unknown, this device is hardly suited for accurately determining temperature.

In this regard it is the goal of the invention to further develop a measuring device of the type described above so that it is possible to simply and reliably make exact dimensional measurements, especially of the level of contents in tanks or the like, and an exact measurement of the average temperature. According to the invention this goal is reached for a device of the above-named type by providing the reflector with a through-hole parallel to the axis of the measuring tube and by placing a second ultrasonic transmitter/receiver in the other end of the measuring tube.

The advantages of the invention derive particularly from the fact that the reflector, which can be shifted in the measuring tube and tracked by the tracking device, has a through-hole for the ultrasonic signals and from the fact that within the measuring tube, besides the span measured in reflection between the first transmitter/receiver and the reflector, a second, standardizing span of known length is constructed to extend from the first transmitter/receiver through the through-hole of the reflector on to the second transmitter/receiver at the other end of the measuring tube. In this way it is possible to carry out in one and the same measuring tube a standardizing measurement before each dimensional measurement between a transmitter/receiver and the reflector; this allows one to define an average diffusion speed or, respectively, an average temperature within the measuring tube as the result of the standardizing measurement. Using the average diffusion speed or temperature provided during the standardizing measurement, one can subsequently undertake the measurement of the length between a transmitter/receiver and the reflector in the reflection mode. Using the position of the reflector measured in the second step, one can then if desired carry out a third step to measure the average diffusion speed or to calculate the temperature between the reflector and the other transmitter/receiver.

In a particularly advantageous design of the invention, the measuring tube is placed vertically. The tracking device is constructed as a magnetic float which has a ring magnet surrounding the measuring tube. The cylindrical reflector is magnetized and can be tracked by the magnet of the magnetic float to follow the existing level of contents, where the magnetic float and its magnet are to be found. After the standardizing measurement, this arrangement permits a second measuring step for the exact determination of the level of contents and then a third measuring step, after the level of contents has been measured, for accurately determining the average temperature in the section of the measuring tube which lies below the reflector. When the material of the measuring tube has a high degree of heat-conducting capacity this temperature is the same as the average temperature of the tank contents. Along with the level of contents, the average temperature of the tank contents represents a significant magnitude if one is to be able to ascertain the tank contents and to calculate on the basis of a predetermined reference temperature.

It is preferable to align the first ultrasonic transmitter/receiver in the one end of the measuring tube, the through-hole of the reflector, and the second ultrasonic transmitter/receiver at the other end of the measuring tube in order to produce a straight-line and direct standardizing span and thus to ensure that as large a portion of the transmitted ultrasonic signals as possible are received. Optimally the measuring tube has a circular cross-section and the through-hole is placed in the center of the sector.

It is advantageous if the measuring tube is double-walled in order to as much as possible minimize the influence of the temperature distribution of the surroundings on the temperature distribution in the interior of the measuring tube. It is then advantageous to extend the lead-ins for the second ultrasonic transmitter/receiver between the inner and the outer tube.

As a rule, the temperature distribution which prevails around the measuring tube is characterized by the fact that the liquid contents of the tank in the lower range of the measuring tube and the gaseous environment in the upper range of the measuring tube each have a definite temperature. In order to ensure that this temperature difference balances itself out linearly as much as possible in the wall of the inner tube and in the inner space of the measuring tube, it is advantageous to construct the inner tube of the measuring tube of a metal with a high degree of heat-conducting capacity, e.g., copper. In this way it is possible, as has already been mentioned, to correct for such a linear temperature distribution when determining the level of contents.

Alternatively, the measuring tube can be produced of a material with poor heat-conducting capacity. This is advantageous, for example, when the tank concerned is relatively small and thus filled or emptied quickly, since then, due to the insulating properties of the measuring tube, immediately after the tank is filled or emptied the homogeneous temperature distribution which prevailed in the measuring tube still exists, which makes it easier to establish the level of contents of the filled or effectively emptied tank.

It is preferable to use a temperature sensor wired into a temperature measuring circuit in one end of the inner tube in order to measure the local temperature in this end of the measuring tube. With this temperature value and with the average temperature value established in the standardizing measurement, it is then possible to determine the linear temperature path within the measuring tube and thus to correct for this when measuring the level of contents—for instance by taking into account the corresponding locally variable diffusion speed.

Insofar as the device described by the invention is to be used solely to measure the level of contents, the inner tube of the double-walled measuring tube can be alternatively formed as a thin-walled double tube made of a metal like copper which conducts heat and provided with a coolant, e.g. freon, between its inner and outer wall. The inner tube then functions as a heat pipe which possesses a basically constant temperature along its entire length, a fact which eliminates the possible need for correction along the measuring tube which might otherwise be necessary due to the linear temperature distribution.

The measuring tube is preferably hermetically sealed in order to keep the influence of the measuring tube's environment on the measurement inside the tube as slight as possible.

In the transmitting mode, the first or, respectively, the second ultrasonic transmitter/receiver preferably emits pre-determined number of ultrasonic impulses. The trasmitter/receiver at the other end of the measuring tube is triggered by a trigger switch into the receiving mode for a pre-determined block of time or time interval for the standardizing measurement, while for the measurement of the level of content this same trigering process acts on the receiving part of the first or, respectively, the second ultrasonic transmitter/receiver. Besides this, a counter is set ready to count at the beginning of the transmitting mode by the trigger switch in order to measure the diffusion times of the ultrasonic signals. This counter counts clock impulses of constant frequency from a clock impulse generator until the signal has traversed the standardizing span.

A logic circuit is wired into the receiving part of each of the two ultrasonic transmitters/receivers, and this logic circuit transfers the received signal for further processing only if just as many ultrasonic impulses are received during the pre-determined block of time as had been transmitted. If fewer ultrasonic impulses are counted during this block of time, this measurement is then negated.

According to the invention every measurement of the level of contents is accompanied by a standardizing measurement. During the measurement of the level of contents, a measurement is made of the diffusion time which the ultrasonic signal requires to go from one of the transmitters/receivers to the reflector and then back to the same transmitter/receiver, whereby the receiving part of the transmitter/receiver receives that part of the ultrasonic signal which is reflected on the surface of the reflector.

During the standardizing measurement a measurement is made of the diffusion time which the ultrasonic signal requires for traversing the known length of the standardizing span. Using the diffusion time measured during the standardizing measurement, a computer which is connected to the clocking counter calculates the average diffusion speed and the average temperature in the measuring tube. Then, using the diffusion time measured during the measurement of the level of contents and the average diffusion speed, the computer determines the sought-for length of the diffusion span which is a measure of the level of fluid in the tank plant.

It is preferable to have the measured temperature value conveyed periodically from the temperature sensor to the computer. Using the average temperature value determined during the standardizing measurement and the temperature value which was measured at one end of the measuring tube, the computer calculates a linear temperature distribution along the measuring tube; and this temperature distribution corresponds fairly accurately to the actual conditions in a double-walled measuring tube which is well insulated from the outside and whose inner tube conducts heat well. The computer then calculates a local speed distribution along the measuring tube which corresponds to the established linear temperature distribution and subsequently uses this speed distribution as a basis to determine the level of contents from the diffusion time measured during the measurement of the level of contents.

If the measurement of the level of contents is carried out with the first transmitter/receiver, which is placed above the reflector, and if the level of contents is determined by taking into consideration the temperature value measured at the upper end and the corresponding linear temperature distribution, the result is a very accurate definition of the level of contents. According to the invention, a third step can be undertaken, using the previously determined level of contents, in which the second transmitter/receiver is first placed in the transmitting and then in the receiving mode in order to establish the diffusion time required for ultrasonic signals to travel from the second transmitter/receiver to the reflector. This third measurement can then be used to ascertain the average temperature which prevails between the lower end of the measuring tube and the reflector; if the measuring tube has a high degree of heat-conducting capacity, this will be the same as the average temperature of the tank contents.

In a preferred design of the invention, the computer and the trigger switch controlled by the computer can serially check the several measuring tubes in several tanks and indicate the respective levels of content. The levels of content ascertained by the computer can be shown on an electronic counter. Alternatively, the results can be shown on a monitor.

In the following, an exemplary design of the invention will be described in detail with the aid of the diagrams:

FIG. 3 shows a schematic diagram of the device according to the invention.

Figure 1:
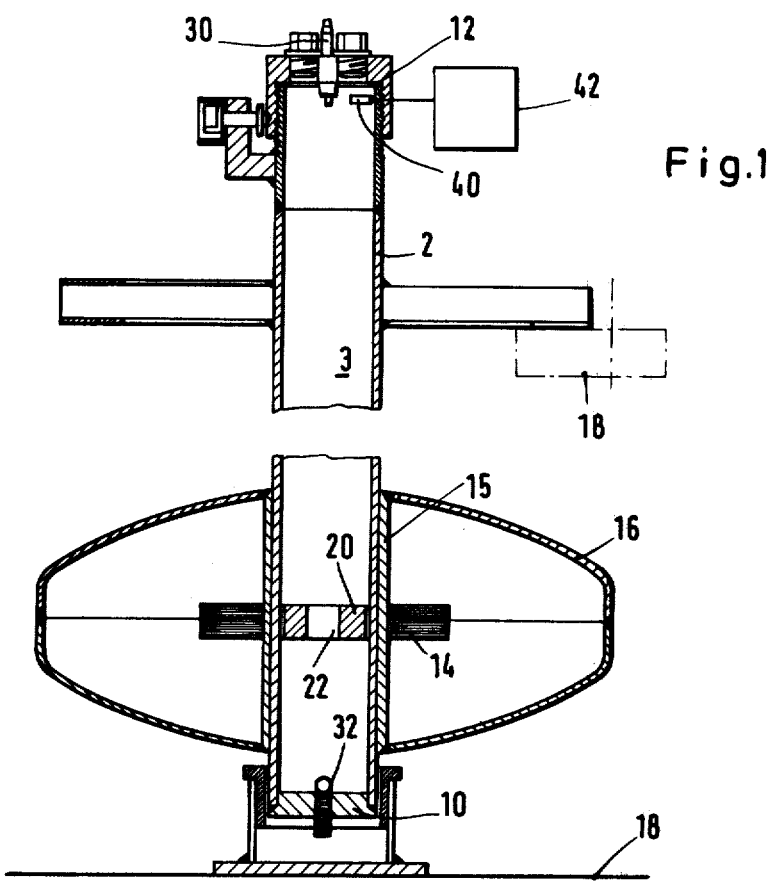
FIG. 1 shows a side sectional view of the measuring tube of a device constructed according to the invention.

FIG. 1 shows a cross-sectional side view of the measuring tube 2 of the device 1 constructed according to the invention. The measuring tube 2 is built vertically into a tank 18. A magnetic float 14,16 surrounds the measuring tube 2 with a casing 15, which is connected with the buoyancy unit 16. A magnet 14 which sticks into the buoyancy unit 16 is mounted on the casing 15 at the immersion level. A cylindrical reflector 20 made of magnetized or magnetizable material is set in the measuring tube 2 so that it can be moved and is constantly kept at the existing level of the tank 18 contents by the magnet 14 of the magnetic float 14,16.

The measuring tube 2 has circular cross-section. The reflector 20 has the shape of a circular cylinder whose cylindrical surface can be moved along the inner wall of the measuring tube 2 with just a little play. A through-hole 22 is placed in the center of the reflector 20, parallel to the cylinder's axis.

The transmitter 30 of a first ultrasonic transmitter/receiver, which is referred to below as the first ultrasonic transmitter/receiver 30, is placed in the top wall 12 of the measuring tube 2, coaxial to the axis of the measuring tube. Aligned with the first ultrasonic transmitter/receiver 30 and the through-hole 22, the transmitter 32 of a second ultrasonic transmitter/receiver, which is referred to below as the second ultrasonic transmitter/receiver 32, is placed in the bottom wall 10 of the measuring tube 2.

A temperature sensor 40 with a connected temperature measuring circuit, which measures the temperature at the upper end of the measuring tube 2, is also placed at that point of the measuring tube 2.

Figure 2:
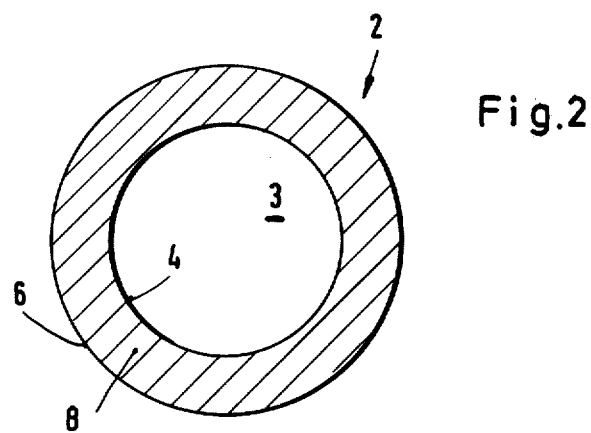
FIG. 2 shows a section through a double-walled measuring tube which can be used in place of the single-walled measuring tube of FIG. 1.

FIG. 2 shows the cross-section of a double-walled measuring tube 2 which can be used for measuring the level of contents instead of the single-walled measuring tube used in FIG. 1. The measuring tube has an inner tube 4 and a coaxial outer tube 6, separate from the inner tube. Between the inner tube 4 and the outer tube 6 there is an insulating filler 8 to protect the inner space 3 of the measuring tube from the influence of the outer temperature and its alterations. The lead-ins for the second ultrasonic transmitter/receiver 30 are also run between the inner tube 4 and the outer tube 6. The inner tube 4 is made of a metal with a high degree of heat-conducting capacity, e.g., copper, so that the wall of the inner tube 4 has basically a linear temperature distribution and so that it equalizes localized temperature variations introduced from outside. Alternatively, the inner tube 4 may be constructed as a double tube with a thin inner wall and a thin outer wall. A coolant, e.g., freon, fills up the space between the inner wall and the outer wall; and this material keeps the temperature basically constant over the entire length of the tube in the inner space 3 of the measuring tube 2. In all the designs of the measuring tube 2, its inner space 3 is hermetically sealed by means of the two end walls 10,12 in order to keep the temperature distribution in the inner space 3 from being influenced by the entry of gases from outside.

FIG. 3 shows a schematic diagram of the invention's device for measuring the level of contents. The first ultrasonic transmitter/receiver 30, whose transmitter is built into the upper end of the measuring tube 2, and the second ultrasonic transmitter/receiver 32, whose transmitter is placed in the lower end of the measuring tube 2, each act on a logic circuit 34,36, whose output is connected with the input of a counter 38. A trigger switch 44 controls the first and the second ultrasonic transmitters/receivers 30 and 32, the counter 38, and a clock impulse generator 48 connected to the counter 38; and the trigger switch is itself controlled by a computer 46. The counter is likewise connected with the computer 46, which contains a memory for recording the measurement results. The counter 38, clock impulse generator 48, and trigger switch 44 can also be integral components of the computer.

Located next to the computer 46 is a monitor 52 which is connected with the computer 46 and indicates the results of calculations etc. when needed. Near the measuring tube 2 there is also an indicator of the level of contents 50, preferably an indicating counter, to which the computer 46 sends information about the level of contents which has been measured in the measuring tube which is being checked.

To start the standardizing operation, the trigger switch 44 puts one of the ultrasonic transmitters/receivers 30,32 in the reception mode and connects the clock impulse generator 48 with the counting input of the counter 38. When the transmitting mode begins, the counter 38 counts the clock impulses delivered by the clock impulse generator 48, and the transmitting ultrasonic transmitter/receiver emits a pre-determined number of ultrasonic impulses which the other ultrasonic receiver at the other end of the measuring tube 2 receives. If all of the ultrasonic impulses are received within the block of time pre-determined by the trigger switch 44, then the time interval counted out by the counter 38 between the transmission and reception of the ultrasonic impulses is conveyed to the computer 46 and used there for calculating the average temperature in the measuring tube.

Then the device switches over to the mode for measuring the level of contents. The second transmitter/receiver 32 is shut off, and the counter 38 is triggered into the ready state through the emission of ultrasonic impulses by the ultrasonic transmitter/receiver 30. After emitting the ultrasonic impulses, the transmitter/receiver 30 is switched over to the receiving mode for a pre-determined block of time by the trigger switch 44, itself computer-controlled, in order to be able to receive the ultrasonic impulse portion reflected by the reflector 20. The time interval elapsed between the transmission and reception of the ultrasonic impulses is measured by the counter 38 and then conveyed to the computer 46 via the logic circuit 34, so long as all the impulses are received within the pre-determined block of time.

From the diffusion time measured during the standardizing measurement, the computer 46 calculates the average diffusion speed and the average temperature in the inner space 3 of the measuring tube 2. From the diffusion time measured during a measurement of the level of contents, the computer subsequently uses the computed average diffusion speed to calculate the diffusion span which is sought, which span represents a measure of the level of the fluid content in the tank plant.

Besides this, the temperature value in the upper end of the measuring tube 2 calculated by the temperature measuring circuit 40,42 can be conveyed to the computer 46. Then, using the average temperature value established in the standardizing measurement and the temperature value measured in the upper end, the computer 46 calculates a linear temperature distribution along the measuring tube, a local speed distribution corresponding to the linear temperature distribution; and taking this speed distribution and the diffusion time measured during a measurement of the level of contents as a basis it calculates the level of contents of the tank.

In a third measuring step, following up the measurement of the level of contents, the lower, second transmitter/receiver 32 is put in the reflecting mode and measures the diffusion time which the ultrasonic signal requires to go from the second transmitter/receiver 32 to the reflector 20 and back again. From this measured value the computer 46, using the level of contents calculated in the second measurement step, then calculates the average temperature within the segment of the measuring tube between the reflector and the second transmitter/receiver, i.e., the average temperature within the tank contents.

Knowledge of the level of the contents and the average temperature of the tank contents makes it possible, with the aid of volume table of the tank concerned, to determine the fluid volume contained in the tank and/or the fluid weight, which can be converted to a figure corresponding to the reference temperature established by customs, regulations etc.

I claim:

1. Device for measuring depth and temperature, especially for liquid storage tanks or the like, comprising a vertical measuring tube, a float device encircling the measuring tube, a cylindrical reflector within the measuring tube and vertically movable therein and functionally interconnected with said float device for movement therewith, a first ultrasonic transmitter/receiver in one end of the measuring tube, said reflector having a through-hole parallel to the axis of the measuring tube, and a second ultrasonic transmitter/receiver placed in the other end of the measuring tube.

2. Device for measuring depth and temperature as set forth in claim 1, especially for measuring the level of contents and average content temperature, wherein said float device comprises a magnet around the measuring tube, and the cylindrical reflector is magnetized and can follow said magnet to measure the existing level of contents.

3. Device for measuring depth and temperature as set forth in claim 1 or 2, wherein the first ultrasonic transmitter/receiver in the one end of the measuring tube, the through-hole of the reflector, and the second ultrasonic transmitter/receiver are all in line.

4. Device for measuring depth and temperature as per claim 1 wherein the through-hole is placed in the center of the reflector.

5. Device for measuring depth and temperature as set forth in claim 1 wherein the measuring tube is double-walled having an inner tube and an outer tube, and has an insulating packing between the inner tube and the outer tube, and lead-ins for at least one of the ultrasonic transmitter/receivers are disposed between said inner and outer tubes.

6. Device for measuring depth and temperature as set forth in claim 5, wherein the inner tube is made of a metal with a high degree of heat conductivity.

7. Device for measuring depth and temperature as set forth in claim 5, wherein the inner tube is made of a material with a low degree of heat conductivity.

8. Device for measuring depth and temperature as set forth in claim 6, wherein the inner tube is double-walled and has a filling of coolant between its inner and outer walls.

9. Device for measuring depth and temperature as set forth in claim 5 wherein a temperature sensor wired to a temperature measuring circuit is provided in one end of the inner tube.

10. Device for measuring depth and temperature as set forth in claim 5 wherein a temperature sensor is placed on the reflector and connected with a temperature measuring circuit.

11. Device for measuring depth and temperature as set forth in claim 1 wherein the measuring tube is hermetically sealed.

12. Device for measuring depth and temperature as set forth in claim 1 wherein there is a first standardizing measurement step in which the first ultrasonic transmitter/receiver is in the transmitting mode and emits a predetermined number of ultrasonic impulses which the second ultrasonic transmitter/receiver at the other end of the measuring tube receives, and a second measurement of content level step in which the first ultrasonic transmitter/receiver emits a predetermined number of ultrasonic impulses and then receives the impulses reflected from the reflector during a preselected time period, and further including a clock impulse generator, a trigger switch and a counter set by said trigger switch at the beginning of each transmitting mode of the first ultrasonic transmitter/receiver, said counter then measuring time by counting clock impulses from said clock impulse generator until the time when a signal is received from the second transmitter/receiver from the first transmitter/receiver whereupon the counting mode switches off.

13. Device for measuring depth and temperature as set forth in claim 12 and further including a logic circuit and a computer connected thereto wherein each of the receiving portions of the first and the second ultrasonic transmitter/receiver is wired to said logic circuit which transmits the count of the counter for further processing by said computer only when the number of ultrasonic impulses received during the predetermined time period is the same as the number of ultrasonic impulses transmitted.

14. Device for measuring depth and temperature as set forth in claim 13 and further including an alarm signal triggered by the logic circuit if no corresponding ultrasonic impulses are received within a predetermined time after transmission.

15. Device for measuring depth and temperature as set forth in any one of claims 12-14 including a third step wherein the second ultrasonic transmitter/receiver is in the transmitting mode and emits ultrasonic impulses and then switches to the receiving mode, receives the ultrasonic impulses reflected from the reflector, the counter counting time between transmission and reception of the ultrasonic impulses.

16. Device for measuring depth and temperature as set forth in any of claims 12 through 14, wherein the computer calculates the average transmission speed and the average temperature in the measuring tube from the transmission time measured during the first step and further calculates from the average transmission speed established in the first step and from the transmission time measured in the second step the transmission span of the second step, which represents a measure for the level of the fluid contents of the tank.

17. Device for measuring depth and temperature as set forth in claim 16 wherein the computer calculates the average transmission speed between the second ultrasonic transmitter/receiver and the reflector and the associated average temperature from the level of contents established in the second step and from the transmission time measured in the third step.

18. Device for measuring depth and temperature as set forth in claim 17 further including a temperature sensor and a temperature measurement circuit wherein the temperature value measured by the temperature measurement circuit is delivered to the computer which then calculates a linear temperature distribution along the measuring tube from the average temperature value within the measuring tube established in the first step and from the temperature value measured at the temperature sensor, the computer further calculating a local speed distribution corresponding to the calculated linear temperature distribution along the measuring tube and on the basis of this speed distribution in the measurement of the level of contents determines the level of contents.

* * * * *